US006586894B2

(12) United States Patent
Engelaar et al.

(10) Patent No.: US 6,586,894 B2
(45) Date of Patent: Jul. 1, 2003

(54) PICTURE DISPLAY DEVICE OF THE INDEX TYPE

(75) Inventors: Pieter Johannes Engelaar, Eindhoven (NL); Petrus Johannes Gerardus Van Lieshout, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/094,068

(22) Filed: Mar. 8, 2002

(65) Prior Publication Data

US 2002/0125812 A1 Sep. 12, 2002

(30) Foreign Application Priority Data

Mar. 9, 2001 (EP) ........................................ 01200889

(51) Int. Cl.[7] ........................................ G09G 1/04

(52) U.S. Cl. ........................ 315/370; 313/471; 348/286

(58) Field of Search ........................ 315/370, 372; 313/409, 408, 461, 463, 471; 348/284, 286, 288

(56) References Cited

U.S. PATENT DOCUMENTS 4,183,053 A * 1/1980 Tomii et al. ................ 348/812
4,635,107 A * 1/1987 Turner ........................ 348/812
6,281,947 B1 * 8/2001 Teter et al. ................ 348/742
6,424,102 B1 * 7/2002 Holtslag .................... 315/370

FOREIGN PATENT DOCUMENTS

| EP | 0172722 | 5/1990 | H04N/9/24 |
|---|---|---|---|
| GB | 2122415 | 1/1984 | H01J/31/20 |
| JP | 360141090 A * | 7/1985 | |

* cited by examiner

*Primary Examiner*—Don Wong
*Assistant Examiner*—Thuy Vinh Tran

(57) ABSTRACT

Picture display device comprising a cathode ray tube whose display screen (10) is provided with index electrodes (20, 21) comprising elongated conducting elements disposed substantially parallel to an axis of symmetry (50) of the display screen (10). In operation, the magnetic field of the deflection system of the cathode ray tube induces unwanted crosstalk on said index electrodes (20, 21). By cross-connecting one end (**30*a*) of a conducting element (31) of an index electrode (20) to the opposite side end (40*a*) of another conducting element (41) of said index electrode (20), said crosstalk on said index electrode (20**) is reduced.

8 Claims, 10 Drawing Sheets

PICTURE DISPLAY DEVICE OF THE INDEX TYPE

DESCRIPTION OF THE PRIOR ART

The invention relates to a picture display device comprising a cathode ray tube having a display window with a display screen, said display screen being provided with at least two index electrodes, each index electrode comprising a plurality of conducting elements extending substantially parallel to an axis of symmetry of the display screen.

Picture display devices comprising such index electrodes are known from GB 2122415 and are usually referred to as 'index' display devices.

In such known index display devices, the electron beam—when impinging on a conducting element of an index electrode—generates an index signal which is indicative of the position of the electron beam with respect to said conducting element and/or of the shape of the electron beam. The index signals of the index electrodes are measured and subsequently used in a control loop acting on the deflection and/or formation of the electron beam in order to correct the trajectory and/or shape of the electron beam when it deviates from its nominal trajectory and/or shape.

Although such known index devices work satisfactorily in many circumstances, there is a wish to control the electron beam position and/or shape more accurately.

SUMMARY OF THE INVENTION

It is an object of the invention to provide an index display device with improved index signals from the index electrodes.

To this end, the display device in accordance with the invention is characterized in that at least one index electrode comprises at least one conducting element, one end of which is connected by means of a cross-connection to an opposite side end of another conducting element of said at least one index electrode.

The deflection system of the cathode ray tube indeed generates considerable magnetic fields which induce parasitic currents—also called crosstalk currents—in the conducting elements of the index electrodes. A deflection system within the scope of the invention includes the detection unit as such, but also auxiliary deflection means, for instance, for fine-tuning the deflection. In fact, in index tubes the systems used for tracking the beams (and thus for improving the position and or shape of the electron beams) themselves are a cause of crosstalk currents. These crosstalk currents add up to the index signals and thus constitute noise for the measurement circuit because they do not comprise any information pertaining to the position and/or shape of the electron beam. All of these crosstalk currents flow in the same direction in the conductive elements of an index electrode, so that said crosstalk currents at least partly compensate each other by cross-connecting two conducting elements and thereby reduce the noise.

Conversely, at any given moment, the electron beam only impinges on one conducting element of an index electrode, so that no reduction of the index signal is introduced by cross-connecting conducting elements. The signal/noise ratio is consequently increased, which allows improvement of the accuracy of the electron beam position and/or shape control.

When an index electrode comprises more than two conducting elements, the above-described compensation effect of crosstalk currents can be increased by cross-connecting additional conducting elements. In order to reduce the number of cross-connections, it is advantageous in such a case to cross-connect groups of conducting elements, one group comprising a first set of conducting elements connected together at their same side ends, another group comprising another set of conducting elements connected together at their opposite side ends, while both groups comprise substantially the same number of conducting elements.

Since the magnetic field of the deflection system at the surface of the display screen is generally symmetric with regard to an axis of symmetry of the display screen, it is also advantageous to have both groups of conducting elements disposed symmetrically with regard to said axis of symmetry. In doing so, the sum of the crosstalk currents induced in the conducting elements of the first group will almost equal the sum of the crosstalk currents induced in the conductive elements of the second group, resulting in an almost total compensation of both sums when cross-connecting both groups.

In a simple version, the index electrode is divided into two groups of conducting elements, the first group comprising the conducting elements located on one side of the axis of symmetry of the display screen, the second group comprising the conducting elements located on the opposite side of said axis of symmetry, while both groups are symmetrically disposed with regard to said axis of symmetry and are cross-connected by their opposite side ends.

An index display device often comprises more than one index electrode. Evidently, it is also possible to apply the structure and the interconnections of conducting elements as described above to any other index electrode, thereby improving the signal/noise ratio of the index signal from said any other electrode as well.

These and other aspects of the invention are apparent from and will be elucidated with reference to the embodiments described hereinafter.

DETAILED DESCRIPTION OF PREFERRED EMBODIMENTS

Figure 1:
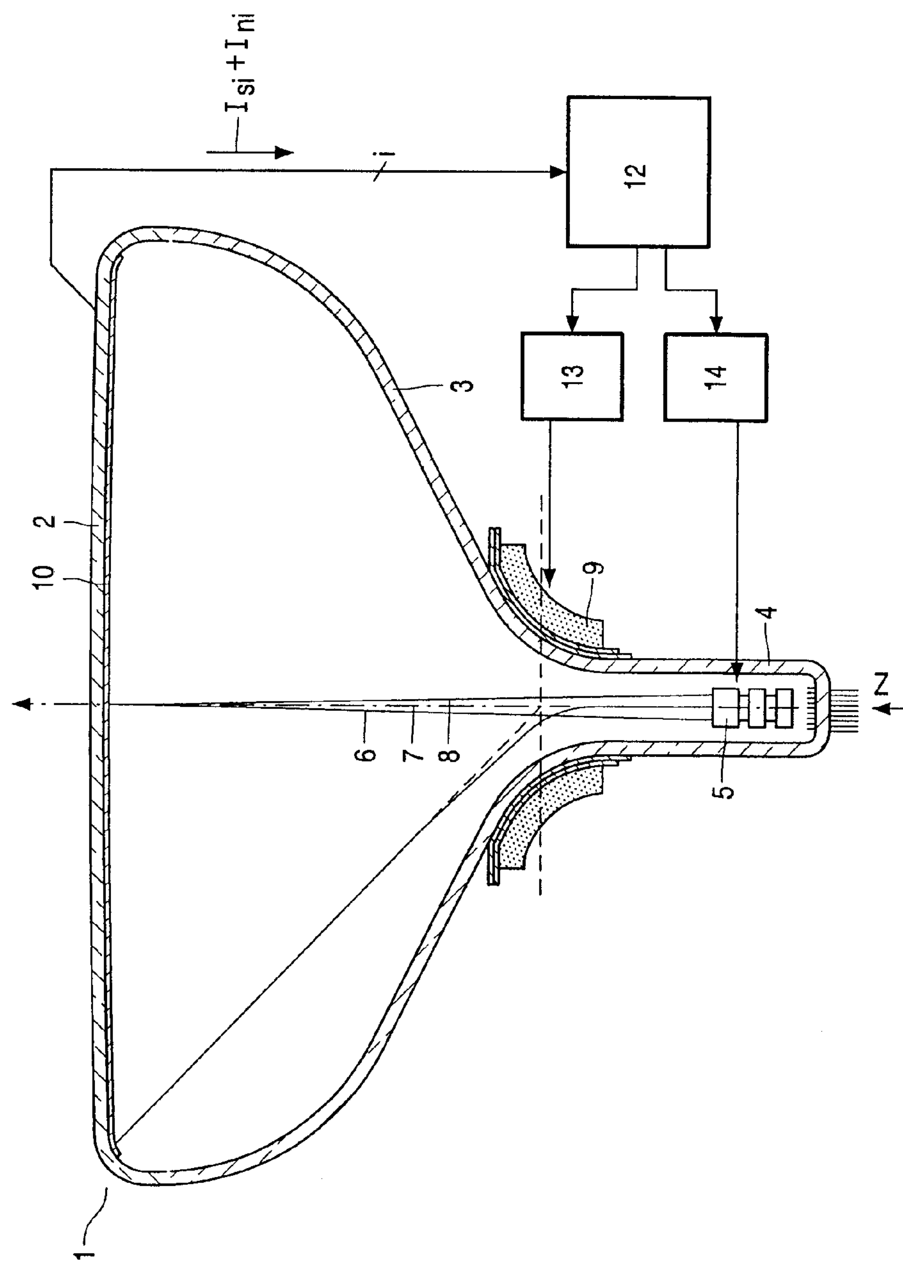
FIG. 1 shows schematically an index display device.

FIG. 1 shows an index display device comprising a colour cathode ray tube 1 having a display window 2, a cone 3 and a neck 4. The neck 4 accommodates an electron gun 5 for generating one or more, in this example three, electron beams 6,7 and 8 extending, in this embodiment, in one plane, the in-line plane. A deflection system 9 is mounted on the i cone 3 for deflecting the electron beams 6,7,8 across the display window 2. A display screen 10 is situated on the inner side of the display window 2. Said display screen 10 comprises a plurality of red, green and blue-luminescing phosphor elements. Each group of (red, green or blue) phosphor elements forms a pattern. The display screen 10 may also comprise other patterns such as a black matrix (a black pattern) or colour filter patterns. These patterns are provided with index electrodes, each index electrode comprising a plurality of interconnected conducting elements.

Figure 2:
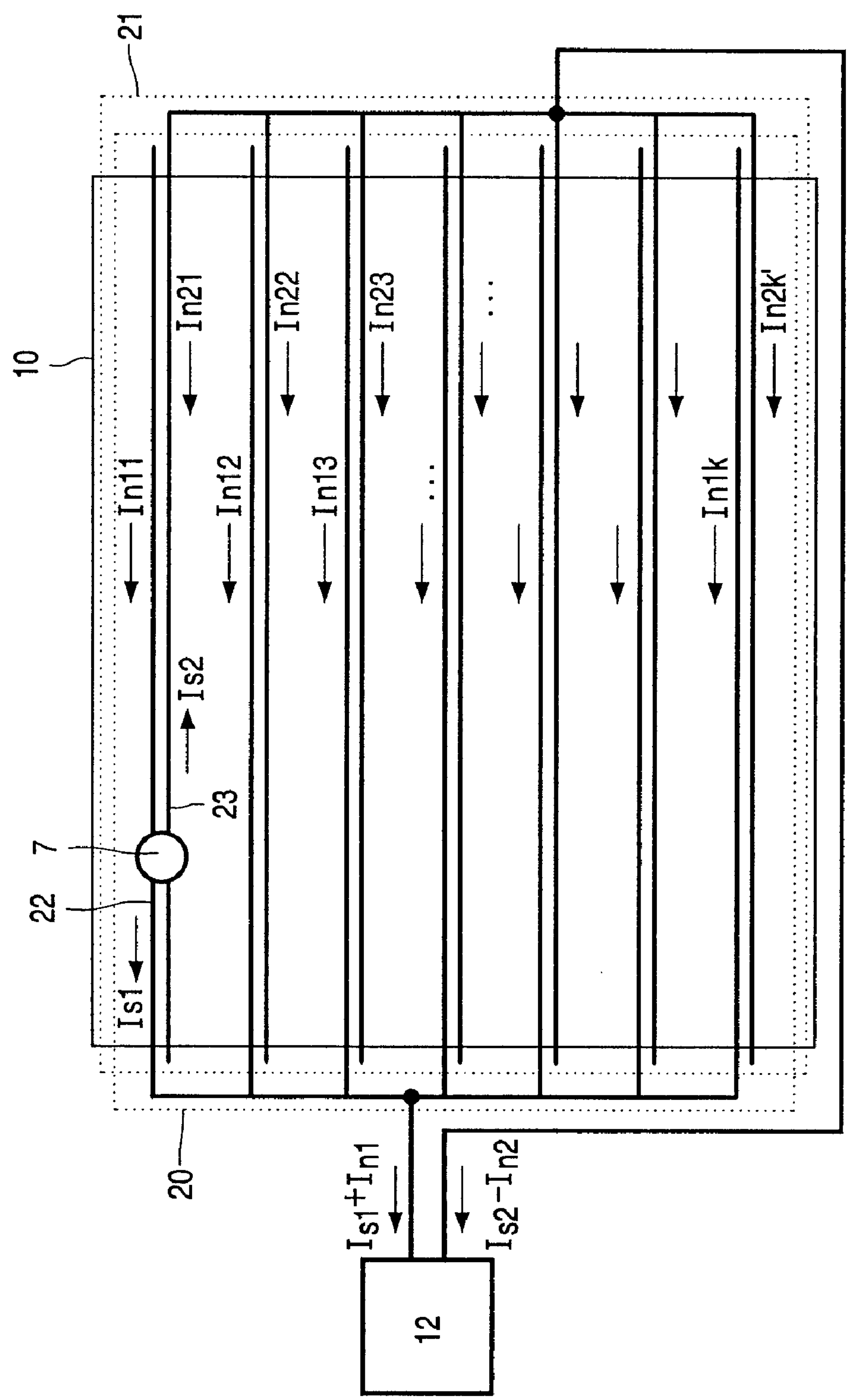
FIG. 2 shows schematically the display screen of a known index display device and the index signal measurement means.

FIG. 2 shows the display screen 10 of a known index display device and the index signal measurement means 12. The display screen 10 of such a known index display device usually comprises two index electrodes 20 and 21 whose conducting elements are interdigitated. The conducting elements of the first electrode 20 are interconnected by one of their side ends. The conducting elements of the second electrode 21 are interconnected by their opposite side ends. When an electron beam 7 passes across a conducting element 22 of the first index electrode 20, a first index signal $I_{s1}$ appears which is indicative of the position of the electron beam 7 with respect to said conducting element 22 and/or of the shape of the electron beam 7. Similarly, when the electron beam 7 passes across a conducting element 23 of the second index electrode 21, a second index signal $I_{s2}$ appears which is indicative of the position of the electron beam 7 with respect to said conducting element 23 and/or of the shape of the electron beam 7.

A measurement circuit 12 connected to both index electrodes 20 and 21 measures these index signals $I_{s1}$ and $I_{s2}$, and delivers measurement data which are used in this example by a control loop comprising a first control means 13 acting on the deflection system 9 in order to correct the trajectory of the electron beam 7 when it deviates from its nominal trajectory and/or comprising a second control means 14 acting on the formation of the electron beam 7 in order to correct the shape of the electron beam 7 when it deviates from its nominal shape.

The deflection system 9 of the cathode ray tube 1 generates considerable magnetic fields which induce parasitic currents—also called crosstalk currents—in the conducting elements of the index electrodes 20 and 21. All of these crosstalk currents $I_{nij}$ flow in the same direction in said conducting elements so that they add up to form total crosstalk currents $I_{n1}$ and $I_{n2}$ which flow to the measurement circuit 12:

$$I_{n1}=I_{n11}+I_{n12}+I_{n13}+ \ldots +I_{n1k}$$

$$I_{n2}=I_{n21}+I_{n22}+I_{n23}+ \ldots +I_{n2k'}$$

where k=number of conducting elements of the first index electrode 20 k'=number of conducting elements of the second index electrode 21

(in practice, we often have k=k')

These total crosstalk currents $I_{n1}$ and $I_{n2}$ constitute noise for the measurement circuit 12 because neither of them comprises any information pertaining to the position and/or shape of the electron beam 7. Such noise reduces the accuracy of the measurement which in turn negatively influences the accuracy with which the electron beam position and/or shape can be controlled. One way of understanding the crosstalk is to see electrode 20 and 21 as forming an antenna or wire loop wherein the loop is closed via measuring device 12. Any stray current induced by the deflection fields in this loop runs through device 12 and influences the measurement, reducing the signal to noise.

Figure 2A:
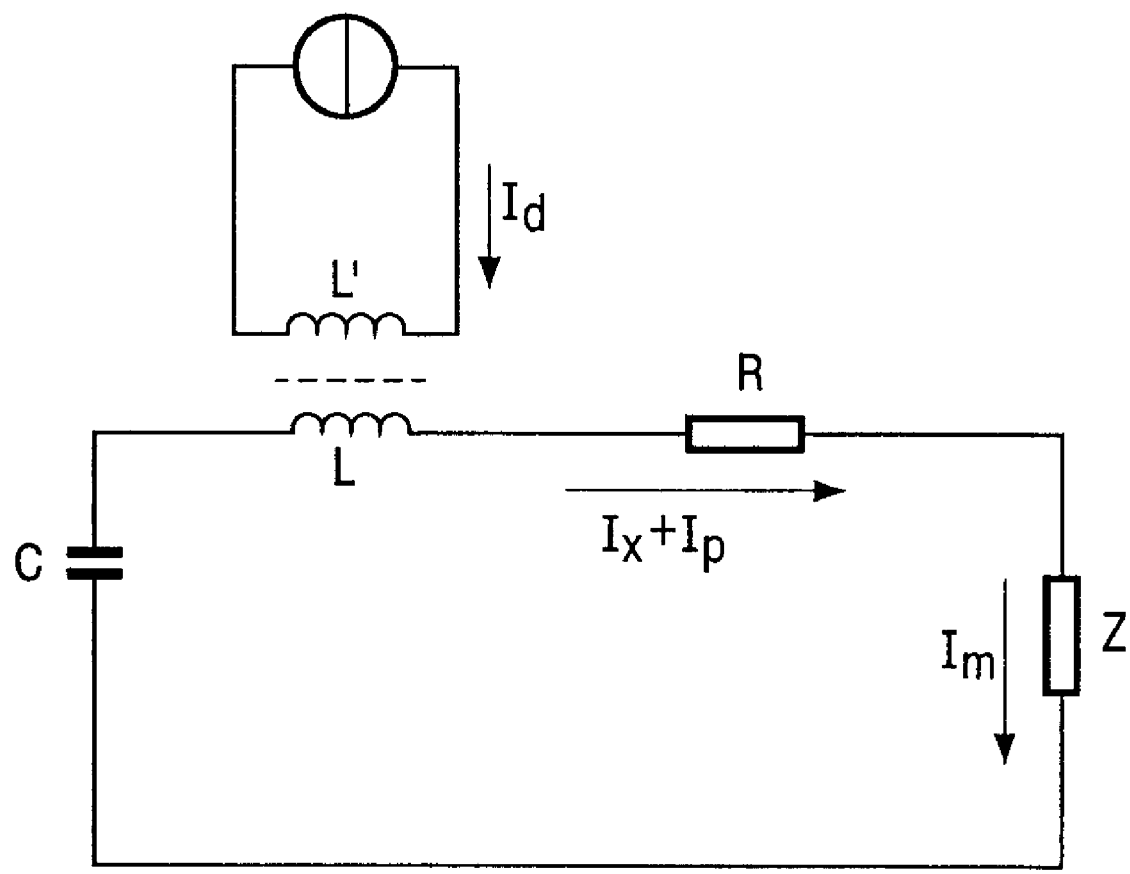
FIG. 2*a* shows an equivalent circuit diagram of the crosstalk mechanism for a known index display device as shown in FIG. 2.

Another way of illustrating the crosstalk mechanism can be seen in FIG. 2*a*. This Figure shows an equivalent circuit diagram of the crosstalk mechanism for a known index display device as shown in FIG. 2. In this FIG. 2*a:*

L' is the deflection coil of the deflection system 9,

L is the equivalent inductance of the conducting elements of the index electrodes 20 and 21, R is the equivalent resistance of the conducting elements of the index electrodes 20 and 21, C is the capacitance between the conducting elements of the index electrodes 20 and 21, Z is the input impedance of the measurement circuit 12, $I_d$ is the deflection current of the deflection system 9, $I_x$ is the current induced by crosstalk from the deflection system 9, and $I_p$ is the current comprising the electron beam position and/or shape information, $I_m$ is the current measured by the measurement circuit 12.

We have:

$$I_m=I_p+I_x.$$

Both $I_p$ and $I_x$ run through Z and cannot be discriminated. It also becomes clear from this equivalent circuit diagram that the crosstalk, which is the transfer from $I_d$ to $I_x$ increases with frequency.

Figure 3:
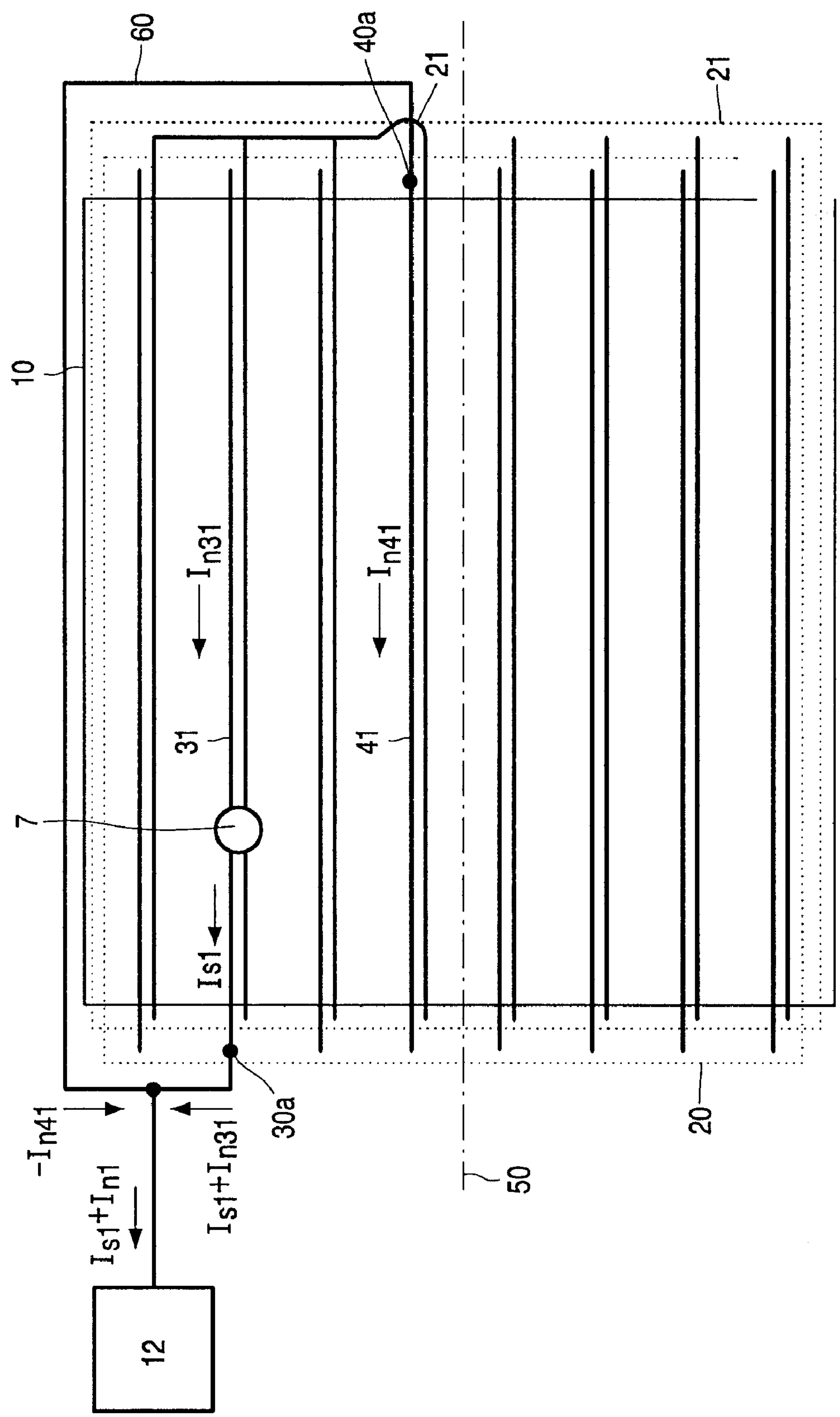
FIG. 3 shows schematically an interconnection of conducting elements of an index electrode according to the present invention.

In a picture display device according to the invention, the conducting elements of the index electrodes are interconnected in a particular way, as can be schematically seen in FIG. 3.

FIG. 3 shows an index electrode 20 having a first conducting element 31, one end 30*a* of which is connected by means of a cross-connection 60 to the opposite side end 40*a* of another conducting element 41 of said index electrode 20. For clarity, the connections of the other conducting elements of said index electrode 20, as well as the connections of the conducting elements of other index electrodes are not shown in this Figure. The crosstalk currents induced by the magnetic field of the deflection system 9 in the conducting elements 31 and 41 are indicated by $I_{n31}$ and $I_{n41}$. The stray current induced by the deflection fields in the loop 31-60-41 and back via the other electrode 21 does not run via the measuring device 12.

Thanks to the cross-connection 60, the total crosstalk current $I_{n1}$ flowing to the measurement circuit 12 equals the difference between the crosstalk current $I_{n31}$ induced in the first conducting element 31 and the crosstalk current $I_{n41}$ induced in the other conducting element 41. In absolute value, this total crosstalk current $I_{n1}$ is smaller than with a known display device where the total crosstalk current would—as said before—equal the sum of the crosstalk currents induced in both conducting elements. Thus, there is a compensation effect of the crosstalk currents. In other terms:

$$I_{n1}=I_{n31}-I_{n41} \text{ and } |I_{n31}-I_{n41}|<|I_{n31}+I_{n41}|$$

Conversely, the electron beam 7 only impinges on the first conducting element 31, so that no reduction of the index signal $I_{s1}$ is introduced by cross-connecting the conducting elements 31 and 41. The index signal/noise ratio $I_{s1}/I_{n1}$ is consequently improved, thereby improving the accuracy of the measurement which in turn positively influences the accuracy with which the electron beam position and/or shape can be controlled.

In preferred embodiments, it is advantageous to cross-connect several conducting elements of an index electrode in order to cumulate the compensation effect. In order to reduce the number of cross-connections, the conducting elements of said index electrode are preferably connected together in groups.

Figure 4:
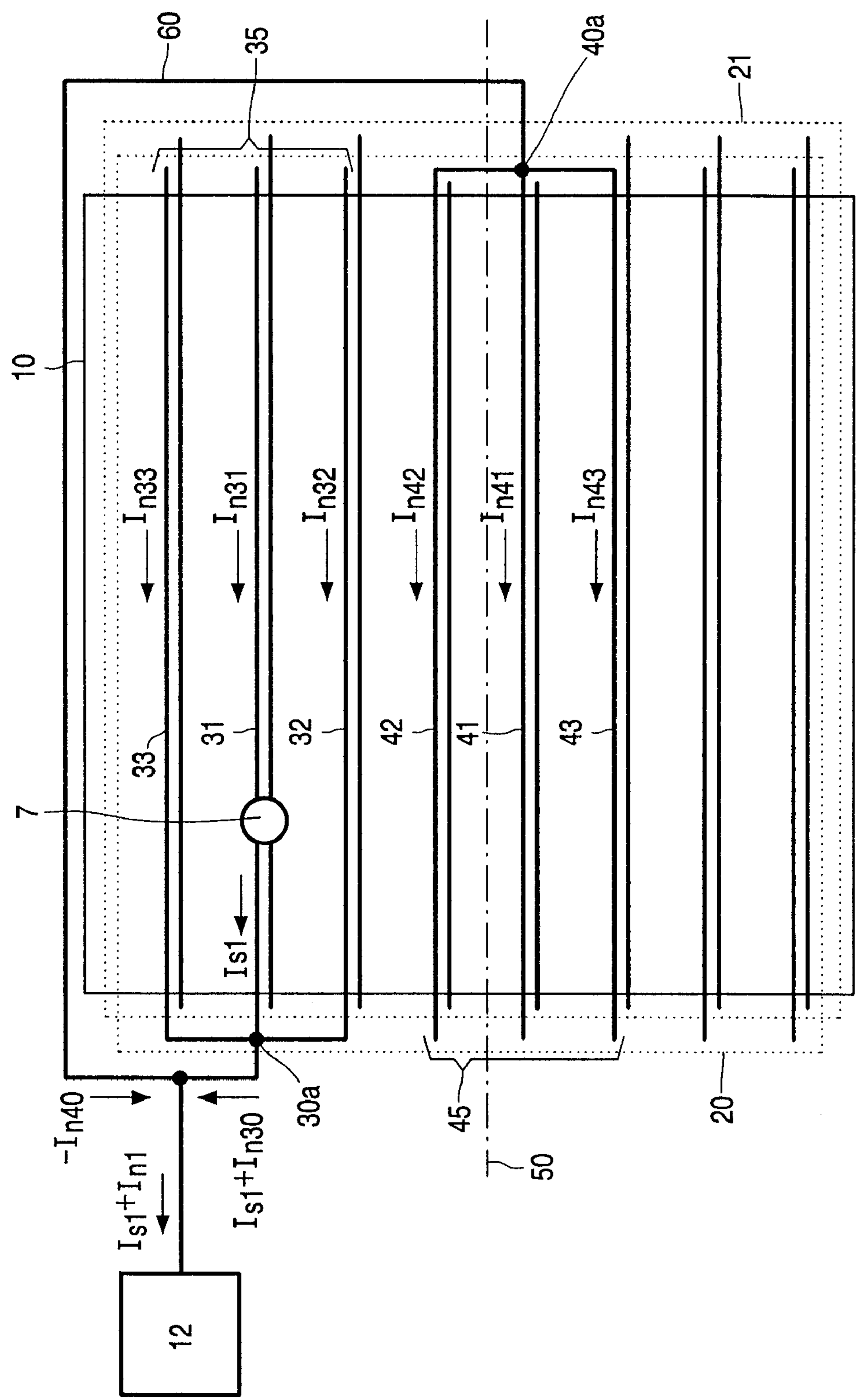
FIG. 4 shows schematically an interconnection of groups of conducting elements of an index electrode according to the present invention.

FIG. 4 schematically shows such a case. Here, three conducting elements 31, 32 and 33 of the index electrode 20 are connected together by one of their side ends 30*a* and constitute a first group 35 of conducting elements. Three other conducting elements 41, 42 and 43 of the same index electrode 20 are connected together by their opposite side ends 40*a* and constitute a second group 45 of conducting elements. The ends 30*a* and 40*a* of both groups 35 and 45 are connected together by means of a cross-connection 60. Again for clarity, the connections of the other conducting elements of the index electrode 20, as well as the connections of the conducting elements of other index electrodes are not shown in this Figure.

With such a cross-connection, the crosstalk currents $I_{n31}$, $I_{n32}$ and $I_{n33}$ induced in the conductive elements 31,32 and 33, respectively, of the first group 35 will compensate the crosstalk currents $I_{n41}$, $I_{n42}$ and $I_{n43}$ induced in the conductive elements 41, 42 and 43, respectively, of the second group 45.

In other terms:

$$I_{n30}=I_{n31}+I_{n32}+I_{n33}$$

$$I_{n40}=I_{n41}+I_{n42}+I_{n43} \text{ and } |I_{n1}|=|I_{n30}-I_{n40}|<<|I_{n30}+I_{n40}|$$

$$I_{n1}=I_{n30}-I_{n40}$$

It also appears from these relations that it is advantageous to have the same number of conducting elements in both groups 35 and 45.

Generally, the magnetic field of the deflection system 9 at the surface of the display screen 10 is substantially symmetric with regard to an axis of symmetry of the display screen 10. It is advantageous to have both groups of conducting elements disposed substantially symmetrically with regard to said axis of symmetry because the amount of crosstalk in symmetrically disposed conducting elements will almost be equal, and therefore the aforementioned compensation will be maximized.

Figure 5:
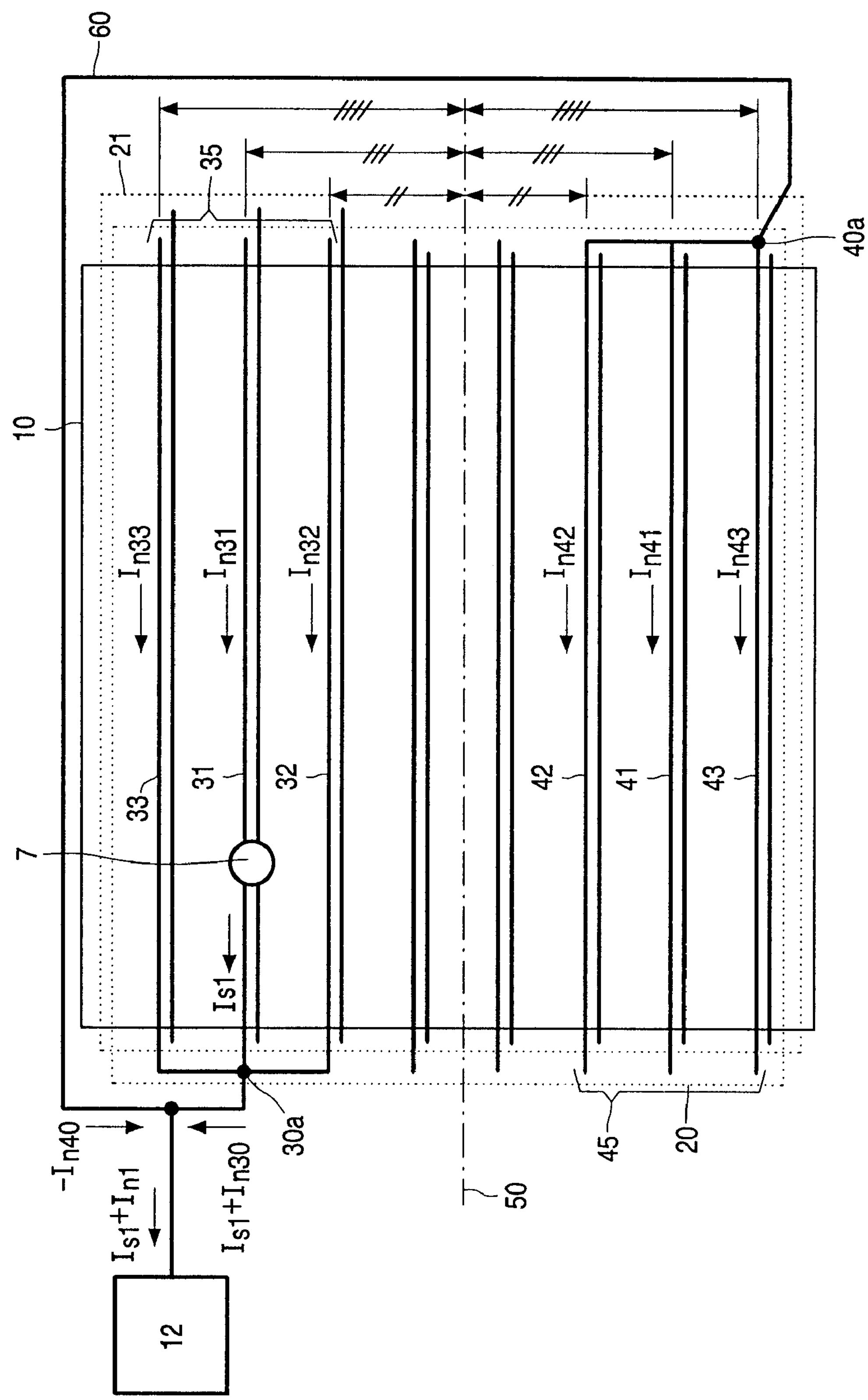
FIG. 5 shows schematically a symmetric arrangement of groups of conducting elements of an index electrode according to the present invention.

Such a situation is schematically shown in FIG. 5. The axis of symmetry 50 divides the display screen 10 into two substantially symmetrical parts. A first group 35 and a second group 45 of conducting elements are disposed symmetrically with regard to said axis of symmetry 50, and the opposite side ends 30*a* and 40*a* of both groups are connected together by means of a cross-connection 60. Again for clarity, the connections of the other conducting elements of the index electrode 20, as well as the connections of the conducting elements of other index electrodes are not shown in this Figure. In doing so, the crosstalk current induced in any conducting element of the first group 35 will almost equal the crosstalk current induced in the symmetrically disposed conducting element of the second group 45, resulting in an almost total compensation of all crosstalk currents when cross-connecting both groups 35 and 45.

In other terms:

$$I_{n31}=I_{n41}+\epsilon 1$$

$$I_{n32}=I_{n42}+\epsilon 2$$

$$I_{n33}=I_{n43}+\epsilon 3 \text{ and } |I_{n1}|=|I_{n30}-I_{n40}|=|\epsilon 1+\epsilon 2+\epsilon 3|<<<|I_{n30}+I_{n40}|$$

$$I_{n30}=I_{n31}+I_{n32}+I_{n33}$$

$$I_{n40}=I_{n41}+I_{n42}+I_{n43}$$

Figure 6:
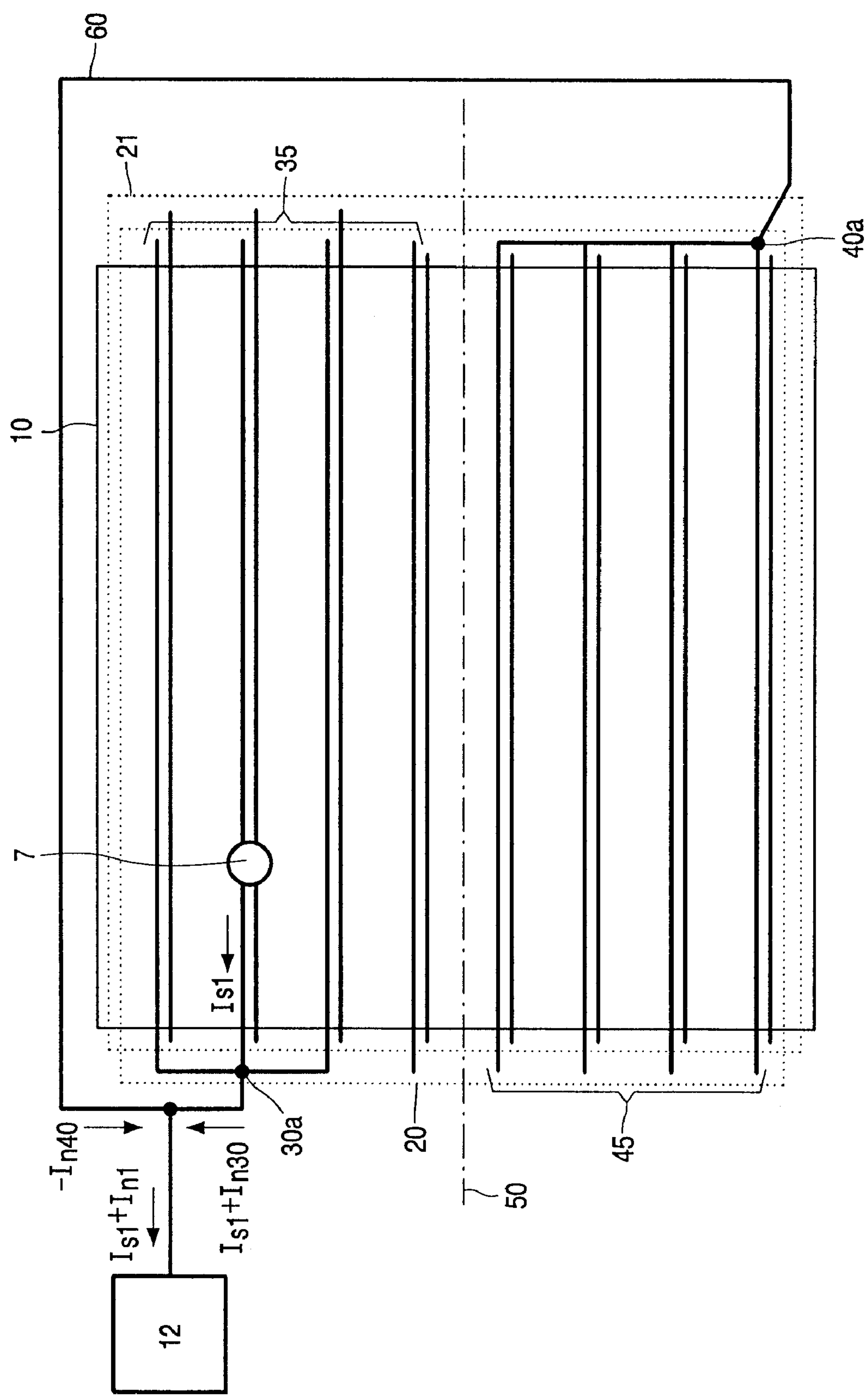
FIG. 6 shows schematically a typical index electrode according to the present invention.

In a preferred simple embodiment, an index electrode consists of exactly two groups of conducting elements, as shown in FIG. 6. The index electrode 20 consists of a first group 35 and a second group 45, said groups 35 and 45 being disposed symmetrically with regard to the axis of symmetry 50 of the display screen 10. The opposite side ends 30*a* and 40*a* of both groups 35 and 45 are connected together by means of a cross-connection 60. For clarity, the connections of the conducting elements of other index electrodes are not shown in this Figure. This configuration is based on the same principle as the one explained in the previous case (FIG. 5). The total crosstalk current $I_{n30}$ induced in the first group 35 almost equals the total crosstalk current $I_{n40}$ induced in the second group 45, so that the total crosstalk current $I_{n1}$ flowing to the measurement circuit 12 is almost zero.

In other terms:

$$I_{n30}=I_{n40}+\epsilon \text{ and } |I_{n1}|=|I_{n30}-I_{n40}|=|\epsilon|<<<|I_{n30}+I_{n40}|$$

The display screen of an index display device often comprises more than one index electrode. Evidently, it is also possible to apply the structure and the interconnections of conducting elements as described above to any other index electrode, thereby improving the signal/noise ratio of the index signal from said other electrode as well.

Figure 7:
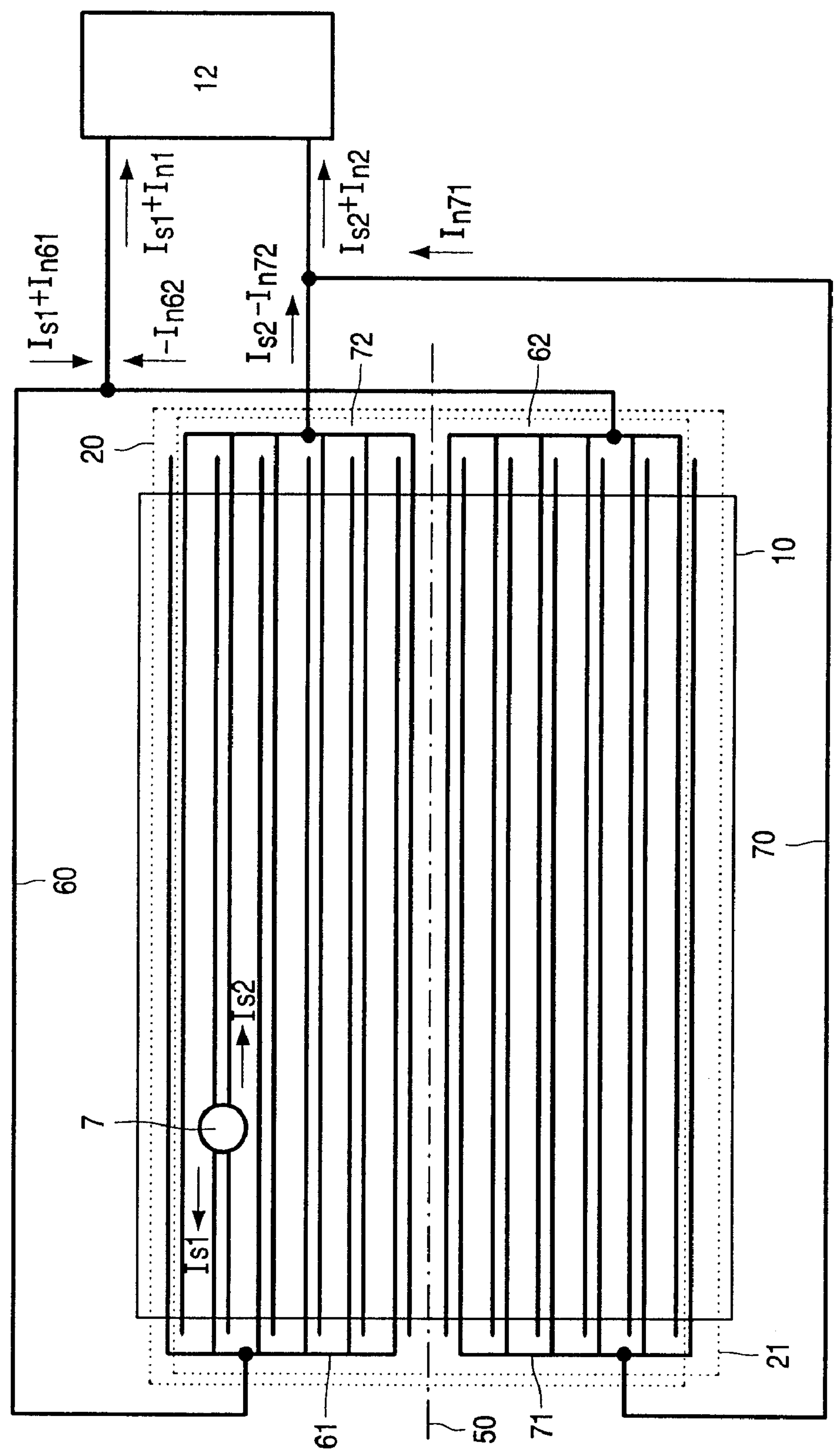
FIG. 7 shows schematically a typical arrangement of two index electrodes according to the present invention.

FIG. 7 schematically shows an example of an index display device according to the invention, comprising two interdigitated electrodes 20 and 21. The first electrode 20 has two groups 61 and 62 of conducting elements, which are both cross-connected together by a cross-connection 60. The second electrode 21 has two other groups 71 and 72 of conducting elements, which are both cross-connected together by another cross-connection 70.

For each electrode, the total crosstalk current ($I_{n1}$,$I_{n2}$) flowing to the measurement circuit 12 is reduced, in accordance with the principle explained above for a single electrode:

for the first electrode 20:

$$I_{n61}=I_{n62}+\epsilon 1 \text{ and } |I_{n1}|=|I_{n61}-I_{n62}|=|\epsilon 1|<<<|I_{n61}+I_{n62}|$$

for the second electrode 21:

$$I_{n71}=I_{n72}+\epsilon 2 \text{ and } |I_{n2}|=|I_{n71}-I_{n72}|=|\epsilon 2|<<<|I_{n71}+I_{n72}|$$

Again, the index signals $I_{s1}$ and $I_{s2}$ are not affected by the cross-connections, so that both signal/noise ratios $I_{s1}/I_{n1}$ and $I_{s2}/I_{n2}$ are improved.

Figure 7A:
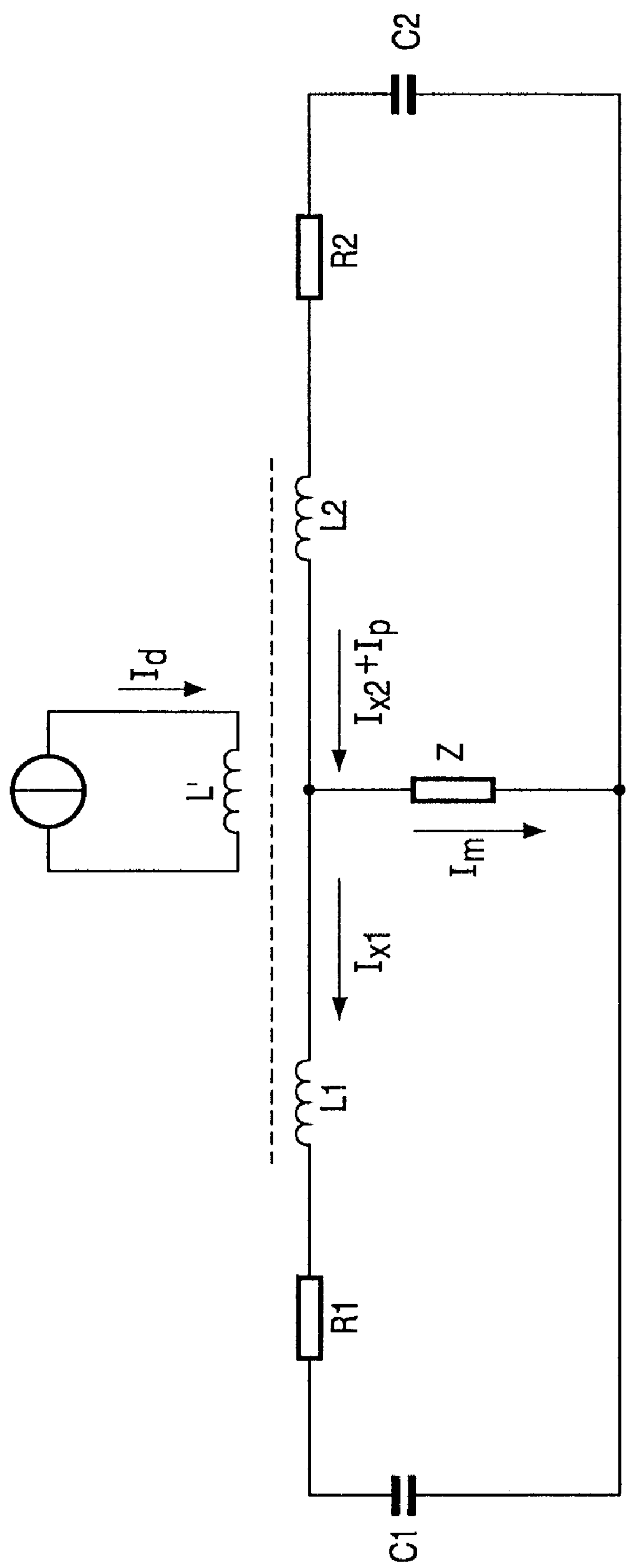
FIG. 7*a* shows an equivalent circuit diagram of the crosstalk mechanism for an index display device according to the present invention as shown in FIG. 7.

Another way of illustrating the crosstalk mechanism for such a case can be seen in FIG. 7*a*. This Figure shows an equivalent circuit diagram of the crosstalk mechanism for an index display device according to the present invention as shown in FIG. 7. In this FIG. *7a:*

L'is the deflection coil of the deflection system 9,

L1 is the equivalent inductance of the groups of conducting elements 61 and 72 of the index electrodes 20 and 21, L2 is the equivalent inductance of the groups of conducting elements 62 and 71 of the index electrodes 20 and 21, R1 is the equivalent resistance of the groups of conducting elements 61 and 72 of the index electrodes 20 and 21, R2 is the equivalent resistance of the groups of conducting elements 62 and 71 of the index electrodes 20 and 21, C1 is the capacitance between the groups of conducting elements 61 and 72 of the index electrodes 20 and 21, C2 is the capacitance between the groups of conducting elements 62 and 71 of the index electrodes 20 and 21, Z is the input impedance of the measurement circuit 12, $I_d$ is the deflection current of the deflection system 9, $I_{x1}$ is the current induced by crosstalk from the deflection system 9 into the groups of conducting elements 61 and 72 of the index electrodes 20 and 21, $I_{x2}$ is the current induced by crosstalk from the deflection system 9 into the groups of conducting elements 62 and 71 of the index electrodes 20 and 21, $I_p$ is the current comprising the electron beam position and/or shape information.

$I_m$ is the current measured by the measurement circuit 12.

In an ideal case: C1=C2, L1=L2 and R1=R2

And consequently: $I_{x1}=I_{x2}$, so that $I_m=I_p$

Crosstalk currents $I_{x1}$ and $I_{x2}$ do not run through Z anymore. On the contrary, $I_p$ runs through Z.

Yet another equivalent way of understanding the phenomenon is as follows (with reference to FIG. 7 and in accordance with the explanation given with reference to FIG. 3):

The electrodes actually constitute an antenna forming a closed double loop (61-60-62-71-70-72-61, etc.) outside the device 12. The current induced in this double loop by the deflection fields does not run via the measurement device 12 and therefor cannot influence the measurement.

In theory, crosstalk can thus be cancelled completely. In practice, the values of the components of both loops, especially the coupling from L to L1 and from L to L2, are not equal, resulting in asymmetry. Thus, crosstalk will not be cancelled completely, but will nevertheless be reduced considerably.

Figure 8:
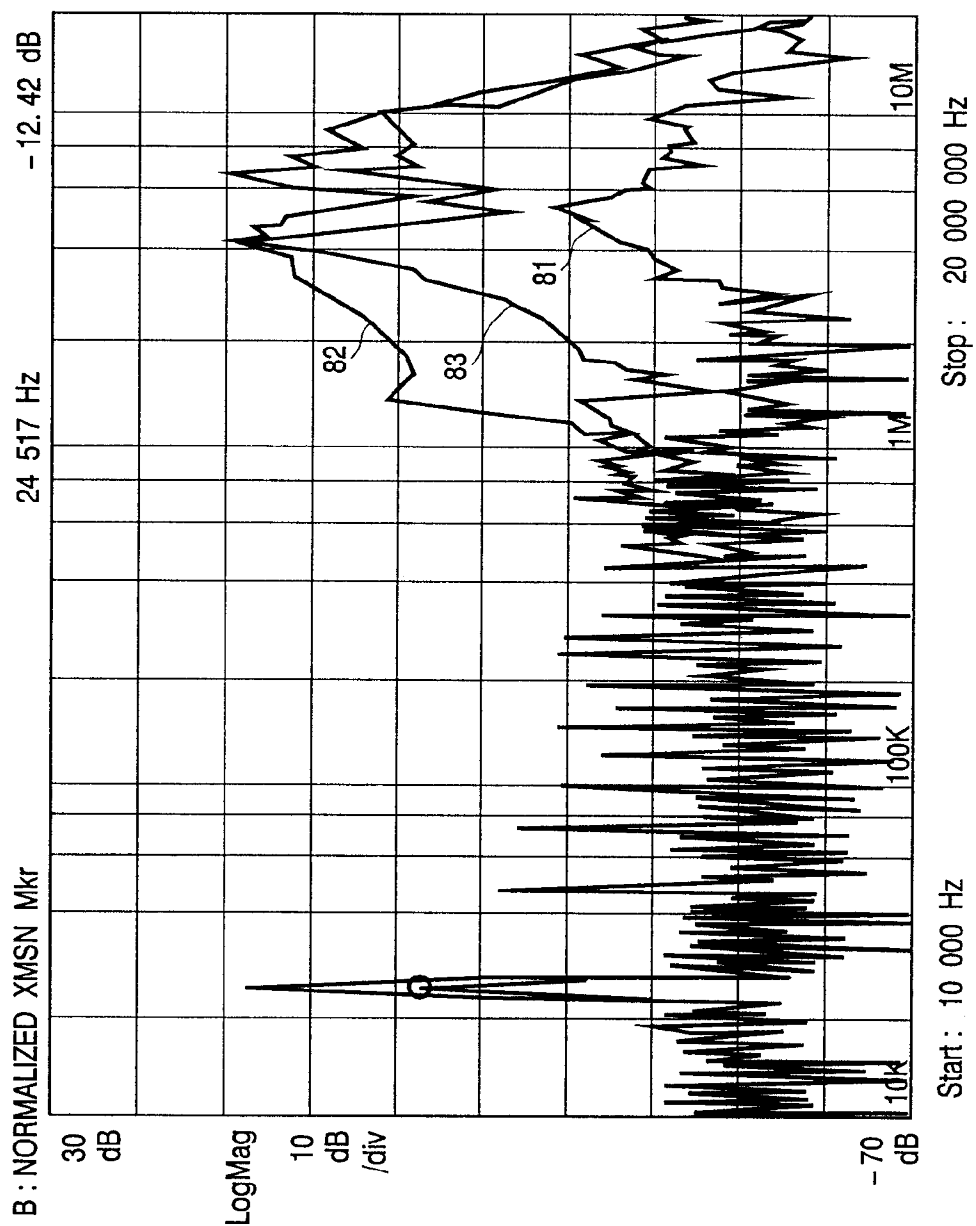
FIG. 8 is a graph showing laboratory measurements of crosstalk for an index display device according to a preferred embodiment of the invention The Figures are not drawn to scale. Generally, identical components are denoted by the same reference numerals in the Figures.

FIG. 8 is a graph showing laboratory measurements of crosstalk for a display device according to the invention and as described in FIG. 7.

A first curve 81 shows measurement results for the case where the index electrodes 20 and 21 are not connected to the measurement circuit 12. This measurement reveals other crosstalk paths than the one acting on the index electrodes 20 and 21.

A second curve 82 shows measurement results for the case where the index electrodes 20 and 21 have their respective groups of conducting elements 61,62 and 71,72 connected to the measurement circuit, but not cross-connected. This case is equivalent to a prior art index display device.

A third curve 83 shows measurement results for the case where the index electrodes are connected as indicated in FIG. 7, i.e. according to a preferred embodiment of the invention. Reduction of crosstalk is evident from the comparison of this third curve 83 with curve 82.

In summary, the invention may be described as follows. A picture display device comprising a cathode ray tube whose display screen is provided with index electrodes comprising elongated conducting elements disposed substantially parallel to an axis of symmetry of the display screen. In operation, the magnetic field generated by the deflection system of the cathode ray tube induces unwanted crosstalk on the index electrodes. By cross-connecting one end of a conducting element of an index electrode to the opposite side end of another conducting element of said electrode, said crosstalk is reduced.

What is claimed is:

1. A picture display device comprising a cathode ray tube (1) having a display window (2) with a display screen (10), said display screen (10) being provided with at least two index electrodes (20, 21), each index electrode comprising a plurality of conducting elements extending substantially parallel to an axis of symmetry (50) of the display screen (10), characterized in that at least one index electrode (20) comprises at least one conducting element (31), one side end (30*a*) of which is connected by means of a cross-connection (60) to an opposite side end (40*a*) of another conducting element (41) of said at least one index electrode (20).

2. A picture display device as claimed in claim 1, characterized in that the one side end (30*a*) of the at least one conducting element (31) is connected to the same side end of other conducting elements (32,33) of said at least one index electrode (20), thereby forming a first group (35) of conducting elements, and in that the opposite side end (40*a*) of the other conducting element (41) is connected to the same opposite side end of further conducting elements (42,43) of said at least one index electrode (20), thereby forming a second group (45) of conducting elements, both groups (35,45) having substantially the same number of conducting elements.

3. A picture display device as claimed in claim 2, characterized in that the first group (35) and the second group (45) of conducting elements are arranged symmetrically with regard to the axis of symmetry (50) of the display screen (10).

4. A picture display device as claimed in claim 3, characterized in that the at least one index electrode (20) substantially consists of the two groups (35,45) of conducting elements.

5. A display window (2) for a cathode ray tube (1) comprising a display screen (10) provided with at least two index electrodes (20, 21), each index electrode comprising a plurality of conducting elements extending substantially parallel to an axis of symmetry (50) of the display screen (10), characterized in that at least one index electrode (20) comprises at least one conducting element (31), one side end (30*a*) of which is connected by means of a cross-connection (60) to an opposite side end (40*a*) of another conducting element (41) of said at least one index electrode (20).

6. A display window (2) as claimed in claim 5, characterized in that the one side end (30*a*) of the at least one conducting element (31) is connected to the same side end of other conducting elements (32,33) of said at least one index electrode (20), thereby forming a first group (35) of conducting elements, and in that the opposite side end (40*a*) of the other conducting element (41) is connected to the same opposite side end of further conducting elements (42,43) of said at least one index electrode (20), thereby forming a second group (45) of conducting elements, both groups (35,45) having substantially the same number of conducting elements.

7. A display window as claimed in claim 6, characterized in that the first group (35) and the second group (45) of conducting elements are arranged symmetrically with regard to the axis of symmetry (50) of the display screen (10).

8. A display window as claimed in claim 7, characterized in that the at least one index electrode (20) substantially consists of the two groups (35,45) of conducting elements.

* * * * *